US012620036B2

(12) United States Patent
Bandopadhyay et al.

(10) Patent No.: US 12,620,036 B2
(45) Date of Patent: May 5, 2026

(54) AUTOMATED SYSTEM AND METHOD FOR ANALYZING AND AUDITING FINANCIAL DATA

(71) Applicant: KPMG LLP, New York, NY (US)

(72) Inventors: Partho Bandopadhyay, Bengaluru (IN); Cameron Gwinn, Dallas, TX (US); Mayank Dhanwantri, Bangalore (IN); Gayathri Krishnan, Thrissur (IN); Chatla Prashanth, Bengaluru (IN); Sahil Kalra, Bangalore (IN)

(73) Assignee: KPMG LLP, New York, NY (US)

( * ) Notice: Subject to any disclaimer, the term of this patent is extended or adjusted under 35 U.S.C. 154(b) by 234 days.

(21) Appl. No.: 18/142,774

(22) Filed: May 3, 2023

(65) Prior Publication Data

US 2024/0370941 A1 Nov. 7, 2024

(51) Int. Cl.
G06Q 40/12 (2023.01)
(52) U.S. Cl.
CPC ................................. G06Q 40/125 (2013.12)
(58) Field of Classification Search
CPC .............................. G06Q 40/125; G06Q 40/12
USPC ......................................................... 705/30
See application file for complete search history.

(56) References Cited

U.S. PATENT DOCUMENTS

2024/0020292 A1* 1/2024 Sehra ..................... G06F 16/254
2024/0168610 A1* 5/2024 Pham ..................... G06N 3/088

OTHER PUBLICATIONS

Cai, Lin-Qin et al. Intelligent Question Answering in Restricted Domains Using Deep Learning and Question Pair Matching. IEEE Access, 2020. (Year: 2020).*

* cited by examiner

*Primary Examiner* — Fawaad Haider
(74) *Attorney, Agent, or Firm* — Nelson Mullins Riley & Scarborough LLP; Anthony Laurentano

(57) ABSTRACT

A financial report analysis system having an intelligent automation unit for selecting from stored financial data the financial data to be processed and automatically scheduling for processing the selected financial data, a conversion unit for converting the selected financial data stored in a storage unit into a selected processing format to form converted financial data, a financial data processing unit for automatically processing the converted financial data to form processed financial data and for generating marked financial data from the processed financial data that includes one or more markings, and a verification unit for verifying an accuracy of the processed financial data by comparing the processed financial data to other financial data, and then highlighting or marking portions of the processed data if the data is inaccurate.

9 Claims, 8 Drawing Sheets

90

| Income statement data | Years Ended December 31, | | | | |
| --- | --- | --- | --- | --- | --- |
| | 2017 | 2016 | 2015 | 2014 | 2013 |
| | (In millions, except per share amounts) | | | | |
| Total revenue | $7,719.4 | $7,138.1 | $6,439.7 | $5,302.9 | $4,319.1 |
| Cost of operations (exclusive of amortization and depreciation disclosed separately below) | 4,269.9 | 4,276.8 | 3,814.4 | 3,218.8 | 2,549.2 |
| Provision for loan loss | 1,140.1 | 940.5 | 668.2 | 425.2 | 345.8 |
| General and administrative | 166.3 | 143.2 | 138.5 | 141.5 | 109.1 |
| Regulatory settlement | — | — | 64.6 | — | |
| Earn-out obligation | — | — | — | 105.9 | |
| Depreciation and other amortization | 183.1 | 167.1 | 142.1 | 109.7 | 84.3 |
| Amortization of purchased intangibles | 314.5 | 345.0 | 350.1 | 203.4 | 131.8 |
| Total operating expenses | 6,073.9 | 5,872.6 | 5,177.9 | 4,204.5 | 3,220.2 |
| Operating income | 1,645.5 | 1,265.5 | 1,261.8 | 1,098.4 | 1,098.9 |
| Interest expense, net | 564.4 | 428.5 | 330.2 | 260.5 | 305.5 |
| Income before income taxes | 1,081.1 | 837.0 | 931.6 | 837.9 | 793.4 |
| Provision for income taxes | 292.4 | 319.4 | 326.2 | 321.8 | 297.2 |
| Net income | $788.7 | $517.6 | $605.4 | $516.1 | $496.2 |
| Less: Net income attributable to non-controlling interest | — | 1.8 | 8.9 | 9.8 | |
| Net income attributable to common stockholders | $788.7 | $515.8 | $596.5 | $506.3 | $496.2 |
| Net income attributable to common stockholders per share: | | | | | |
| Basic | $14.17 | $7.37 | $8.91 | $8.72 | $10.09 |
| Diluted | $14.10 | $7.34 | $8.85 | $7.87 | $7.42 |
| Weighted average shares: | | | | | |
| Basic | 55.7 | 58.6 | 61.9 | 56.4 | 49.2 |
| Diluted | 55.9 | 58.9 | 62.3 | 62.4 | 66.9 |
| Dividends declared per share: | $2.08 | $0.52 | $— | $— | $— |

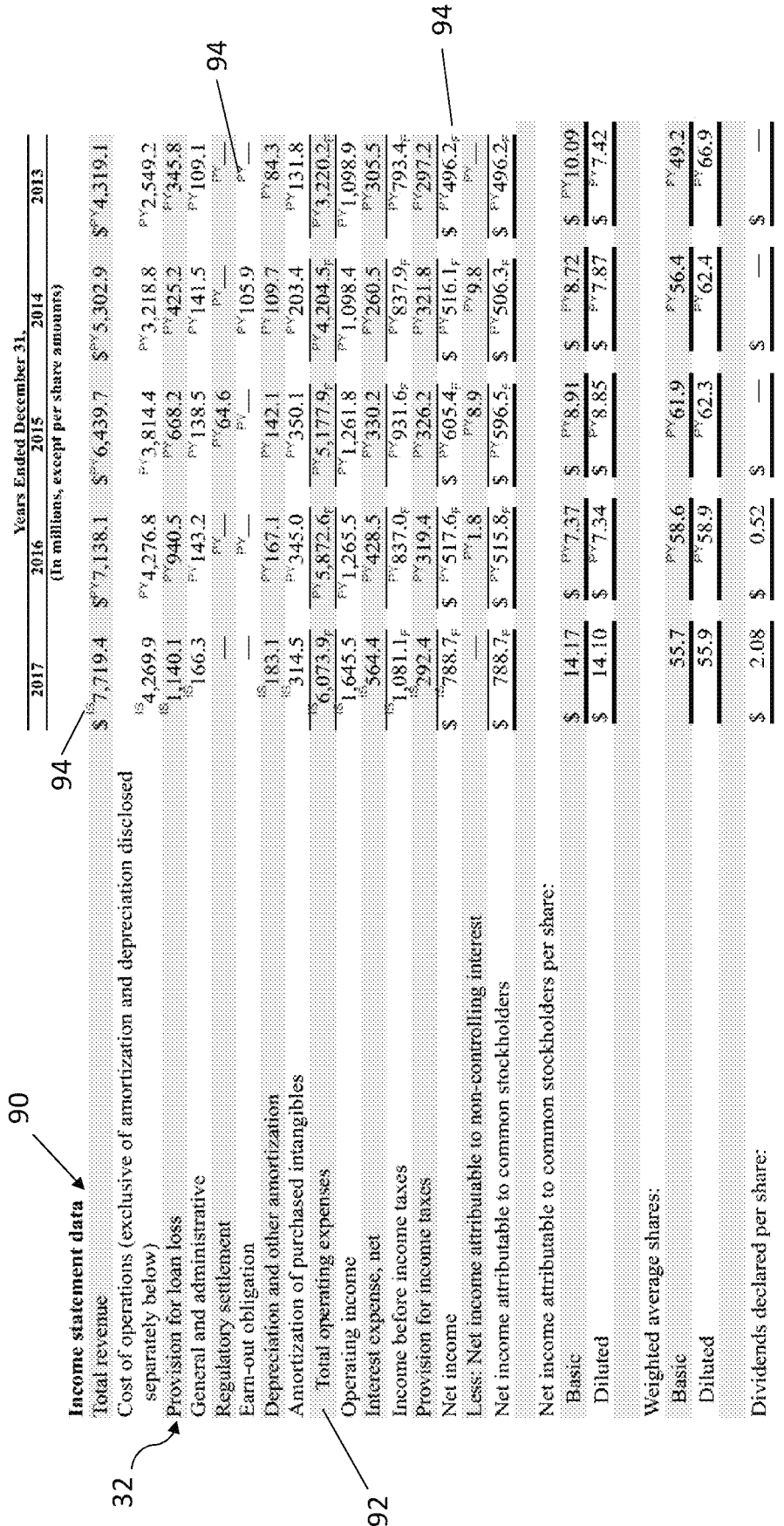

| Income statement data | Years Ended December 31, (In millions, except per share amounts) | | | | |
|---|---|---|---|---|---|
| | 2017 | 2016 | 2015 | 2014 | 2013 |
| Total revenue | $ 7,719.4 | $ 7,138.1 | $ 6,439.7 | $ 5,302.9 | $ 4,319.1 |
| Cost of operations (exclusive of amortization and depreciation disclosed separately below) | 4,269.9 | 4,276.8 | 3,814.4 | 3,218.8 | 2,549.2 |
| Provision for loan loss | 1,140.1 | 940.5 | 668.2 | 425.2 | 345.8 |
| General and administrative | 166.3 | 143.2 | 138.5 | 141.5 | 109.1 |
| Regulatory settlement | — | — | 64.6 | — | — |
| Earn-out obligation | — | — | — | 105.0 | — |
| Depreciation and other amortization | 183.1 | 167.1 | 142.1 | 109.7 | 84.3 |
| Amortization of purchased intangibles | 314.5 | 345.0 | 350.1 | 203.4 | 131.8 |
| Total operating expenses | 6,073.9 | 5,872.6 | 5,177.9 | 4,204.5 | 3,220.2 |
| Operating income | 1,645.5 | 1,265.5 | 1,261.8 | 1,098.4 | 1,098.9 |
| Interest expense, net | 564.4 | 428.5 | 330.2 | 260.5 | 305.5 |
| Income before income taxes | 1,081.1 | 837.0 | 931.6 | 837.9 | 793.4 |
| Provision for income taxes | 292.4 | 319.4 | 326.2 | 321.8 | 297.2 |
| Net income | $ 788.7 | $ 517.6 | $ 605.4 | $ 516.1 | $ 496.2 |
| Less: Net income attributable to non-controlling interest | — | 1.8 | 8.9 | 9.8 | — |
| Net income attributable to common stockholders | $ 788.7 | $ 515.8 | $ 596.5 | $ 506.3 | $ 496.2 |
| Net income attributable to common stockholders per share: | | | | | |
| Basic | $ 14.17 | $ 7.37 | $ 8.91 | $ 8.72 | $ 10.09 |
| Diluted | $ 14.10 | $ 7.34 | $ 8.85 | $ 7.87 | $ 7.42 |
| Weighted average shares: | | | | | |
| Basic | 55.7 | 58.6 | 61.9 | 56.4 | 49.2 |
| Diluted | 55.9 | 58.9 | 62.3 | 62.4 | 66.9 |
| Dividends declared per share: | $ 2.08 | $ 0.52 | $ — | $ — | $ — |

FIG. 3B

Segment Revenue and Adjusted EBITDA, net

96

94

| | Year Ended December 31, | | | % Change | |
|---|---|---|---|---|---|
| | 2017 | 2016 | 2015 | 2017 to 2016 | 2016 to 2015 |
| | (in millions, except percentages) | | | | |
| Revenue: | | | | | |
| LoyaltyOne | $ 1,303.5 | 1,337.9 | $ 1,352.6 | (3)% | (1)% |
| Epsilon | 2,272.1 | 2,155.2 | 2,140.7 | 5 | 1 |
| Card Services | 4,170.6 | 3,675.0 | 2,974.4 | 13 | 24 |
| Corporate/Other | 0.6 | 0.3 | 0.3 | nm * | nm * |
| Eliminations | (27.4) | (30.3) | (28.3) | | |
| Total | $ 7,719.4 | 7,138.1 | $ 6,439.7 | 8 % | 11 % |
| Adjusted EBITDA, net (1): | | | | | |
| LoyaltyOne | $ 256.7 | 308.9 | $ 270.6 | (17)% | 14 % |
| Epsilon | 475.7 | 480.2 | 508.4 | (1) | (6) |
| Card Services | 1,344.9 | 1,213.3 | 1,068.7 | 11 | 14 |
| Corporate/Other | (140.8) | (122.4) | (119.4) | 15 | 3 |
| Total | $ 1,936.5 | 1,880.0 | $ 1,728.3 | 3 % | 9 % |

| | 2018 | 2019 | 2020 | 2021 | Thereafter | Total |
|---|---|---|---|---|---|---|
| | | | (In millions) | | | |
| Term notes | $ 1,341.0 | $ 1,574.0 | $ 1,467.2 | $ 682.5 | $ —— | $ 5,064.7<sup>CF</sup> |
| Conduit facilities (1) | —— | 4,455.0 | | | —— | 4,455.0<sup>CF</sup> |
| Total (2) | $ 1,341.0 | $ 6,029.0 | $ 1,467.2 | $ 682.5 | $ —— | $ 9,519.7<sup>CF</sup> |

| Reporting Unit | Goodwill | Approximate Excess Fair Value % |
|---|---|---|
| | (In millions, except percentages) | |
| Card Services | $ 261.7 | 350 - 410% |
| LoyaltyOne excluding BrandLoyalty | 198.1 | 250 - 270% |
| BrandLoyalty | 533.0 | 40 - 60% |
| Epsilon excluding Conversant | 1,237.0 | 20 - 30% |
| Conversant | 1,650.3 | 10 - 20% |
| Total | $ 3,880.1 | |

AUTOMATED SYSTEM AND METHOD FOR ANALYZING AND AUDITING FINANCIAL DATA

BACKGROUND OF THE INVENTION

The present invention is related to systems and methods for processing financial related data, and more specifically is related to automated systems and methods for processing and analyzing financial information.

In order to comply with current tax and finance related laws, enterprises, such as large companies, typically need to file selected financial related documents with the government at selected times during the year. Many companies engage external tax and audit finance experts (e.g., the tax and audit professionals) to handle the processing of financial related data from the company and to prepare and file the various, necessary filings with the local, state and federal governments and agencies. With regard to large companies, the internal collation, handling, and processing of financial related data can be a monumental task. As such, companies expend significant resources tracking and collating the financial data. Further, large companies oftentimes have many different disparate systems disposed at different locations, all of which are generating financial related information.

Conventional systems exist that allow the companies to collate and store the financial related information, including for example enterprise resource planning (ERP) systems. The companies typically deploy the ERP systems at many different locations to aggregate and store financial related information that are eventually needed by the external finance experts. The large company needs to work closely with the finance experts to allow them access to all of the various ERP systems and the financial data stored therein. Conventionally, the financial data is downloaded or transferred from each of the ERP systems to the external finance expert.

The financial related information is oftentimes shared with the finance experts to perform an audit and to prepare necessary tax filings and financial reports. Tax and financial report preparation, for example, is a necessary but time-consuming and laborious process. It is estimated that individuals and companies spend around 6.1 billion hours per year complying with the filing requirements of various tax and government authorities. Conventional systems and methods exist that allow entities, such as companies, to aggregate financial data, and then process and utilize the financial data as part of various state and federal tax returns and filings and to prepare required financial reports. Conventional systems and methods rely oftentimes on the experience of the finance experts to understand the financial related data and to properly and accurately organize, audit, analyze, reconcile, and report the data. The experts also need to understand the importance of selected types of financial data and how the data affects certain portions of the related financial reports. More specifically, the audit professional oftentimes needs to review voluminous amounts of financial related data, and then needs to determine that the information is accurate within the same document or report, as well as between different documents and reports.

Conventional financial data processing systems and methods, however, have significant drawbacks. For example, the process associated with the preparation of financial reports, including tax returns, is oftentimes highly dependent upon the skill and experience of the financial expert. Thus, the quality of the financial reports tends to vary between financial experts. Also, conventional systems do not necessarily identify areas of the reports that need to be reviewed for further verification by the financial expert. Still further, the conventional systems do not sufficiently flag aberrant financial data.

SUMMARY OF THE INVENTION

The present invention is directed to a system and method for receiving and processing financial data and then marking and verifying the processed financial data. Specifically, the system of the present invention can be configured to convert the financial data into a suitable format, extract relevant portions of the financial data, and then map the data to selected other types of financial data. The system can then apply one or more types of machine learning models to the mapped data in order to perform selected financial operations to the data. The model data can then be marked in a selected manner so as to indicate that the data was processed. Further, the system can be configured to mark and highlight data as part of a verification process so as to indicate that the financial data needs to be further reviewed and processed by the system or a financial expert.

The financial report analysis system of the present invention is configured to assist and ease the burden and simplify the process of reviewing and auditing financial reports, such as financial statements. The audit and review process can include, for example, performing selected audit procedures such as prior year tie outs, footings, cross-footings, internal consistency processes, recalculation processes, and the like. The financial report analysis system can process complex, unstructured and non-standard financial data that is present in the financial statements. As the financial statements are created using various applications and each industry follows specific standards and processes of generating the financial statements, the system is configured to handle and process this disparate data. As such, since the data does not have common patterns, the task of reading, parsing, and extracting relevant financial data is a complex task. The financial report analysis system employs various machine learning models and techniques, such as natural language processing (NLP), named entity recognition (NER), cosine similarity, and custom business logic to extract and match the context across and within the financial statements. The machine learning techniques, in combination with the business intelligence logic, provides for a selected confidence and refinement of the processed financial data.

The present invention is directed to a financial report analysis system that includes an aggregation unit for aggregating financial data and for storing the financial data to form stored financial data, an intelligent automation unit for selecting from the stored financial data the financial data to be processed and automatically scheduling for processing the selected financial data, a storage unit for storing the selected financial data, a conversion unit for converting the selected financial data stored in the storage unit into a selected processing format to form converted financial data, a financial data processing unit for automatically processing the converted financial data to form processed financial data and for generating marked financial data from the processed financial data that includes one or more markings, and a verification unit for verifying an accuracy of the processed financial data by comparing the processed financial data to other financial data, and then highlighting or marking portions of the processed data if the data is inaccurate.

The financial data processing unit can include an extraction unit for automatically parsing the converted financial data to form parsed financial data, a mapping unit for mapping the parsed financial data with other parsed financial data to form mapped financial data, a machine learning unit for applying one or machine learning techniques based on a selected auditing operation to be performed to the mapped financial data to form model data, a filtering unit for filtering the model data by applying thereto one or more business rules to form filtered financial data, and a marking unit for marking one or more portions of the filtered financial data. The verification unit highlights portions of the filtered financial data if the data is inaccurate or is below a threshold accuracy level.

The machine learning unit can apply a first machine learning technique, such as a cosine similarity technique, when a tie out operation is performed on the mapped financial data. The machine learning unit can apply a second different machine learning technique, such as a natural language processing technique, when a recalculation operation is performed on the mapped financial data. The verification unit is configured for determining an accuracy or inaccuracy of the filtered financial data based on the type of auditing procedure being performed.

The present invention is also directed to a computer-implemented method for marking financial data comprising aggregating financial data and storing the financial data to form stored financial data, selecting from the stored financial data the financial data to be processed and automatically scheduling for processing the selected financial data, storing the selected financial data, converting the selected financial data into a selected processing format to form converted financial data, automatically processing with a financial data processing unit the converted financial data to form processed financial data and for generating marked financial data from the processed financial data that includes one or more markings, verifying an accuracy of the processed financial data with a verification unit by comparing the processed financial data to other financial data, and marking portions of the processed data if the data is inaccurate.

The financial data processing unit can include one or more processors programmed for automatically parsing the converted financial data to form parsed financial data, mapping the parsed financial data with other parsed financial data to form mapped financial data, applying one or machine learning techniques based on a selected auditing operation to be performed to the mapped financial data to form model data, filtering the model data by applying thereto one or more business rules to form filtered financial data, and marking one or more portions of the filtered financial data. The verification unit highlights portions of the filtered financial data if the data is inaccurate.

The computer-implemented method further comprises applying a first machine learning technique when a tie out operation is performed on the mapped financial data, and applying a second different machine learning technique when a recalculation operation is performed on the mapped financial data.

The present invention is also directed to a non-transitory, computer readable medium comprising computer program instructions tangibly stored on the computer readable medium, where the computer program instructions are executable by at least one computer processor to perform a method, the method comprising aggregating financial data and storing the financial data to form stored financial data, selecting from the stored financial data the financial data to be processed and automatically scheduling for processing the selected financial data, storing the selected financial data, converting the selected financial data into a selected processing format to form converted financial data, automatically processing with a financial data processing unit the converted financial data to form processed financial data and for generating marked financial data from the processed financial data that includes one or more markings, verifying an accuracy of the processed financial data with a verification unit by comparing the processed financial data to other financial data, and marking portions of the processed data if the accuracy of the processed financial data is below a selected threshold accuracy level.

The computer readable medium can also include instructions for automatically parsing the converted financial data to form parsed financial data, mapping the parsed financial data with other parsed financial data to form mapped financial data, applying one or machine learning techniques based on a selected auditing operation to be performed to the mapped financial data to form model data, filtering the model data by applying thereto one or more business rules to form filtered financial data, and marking one or more portions of the filtered financial data. The verification unit marks portions of the filtered financial data if the data is inaccurate.

The computer readable medium can also include instructions for applying a first machine learning technique when a tie out operation is performed on the mapped financial data, and applying a second different machine learning technique when a recalculation operation is performed on the mapped financial data.

BRIEF DESCRIPTION OF THE DRAWINGS

These and other features and advantages of the present invention will be more fully understood by reference to the following detailed description in conjunction with the attached drawings in which like reference numerals refer to like elements throughout the different views. The drawings illustrate principals of the invention and, although not to scale, show relative dimensions.

FIG. 3A is an illustration of the filtered financial data generated by the filtering unit of FIG. 2 according to the teachings of the present invention.

FIGS. 3B-3D are illustrations of the marked financial data generated by the marking unit of FIG. 2 according to the teachings of the present invention.

DETAILED DESCRIPTION OF THE INVENTION

Figure 1:
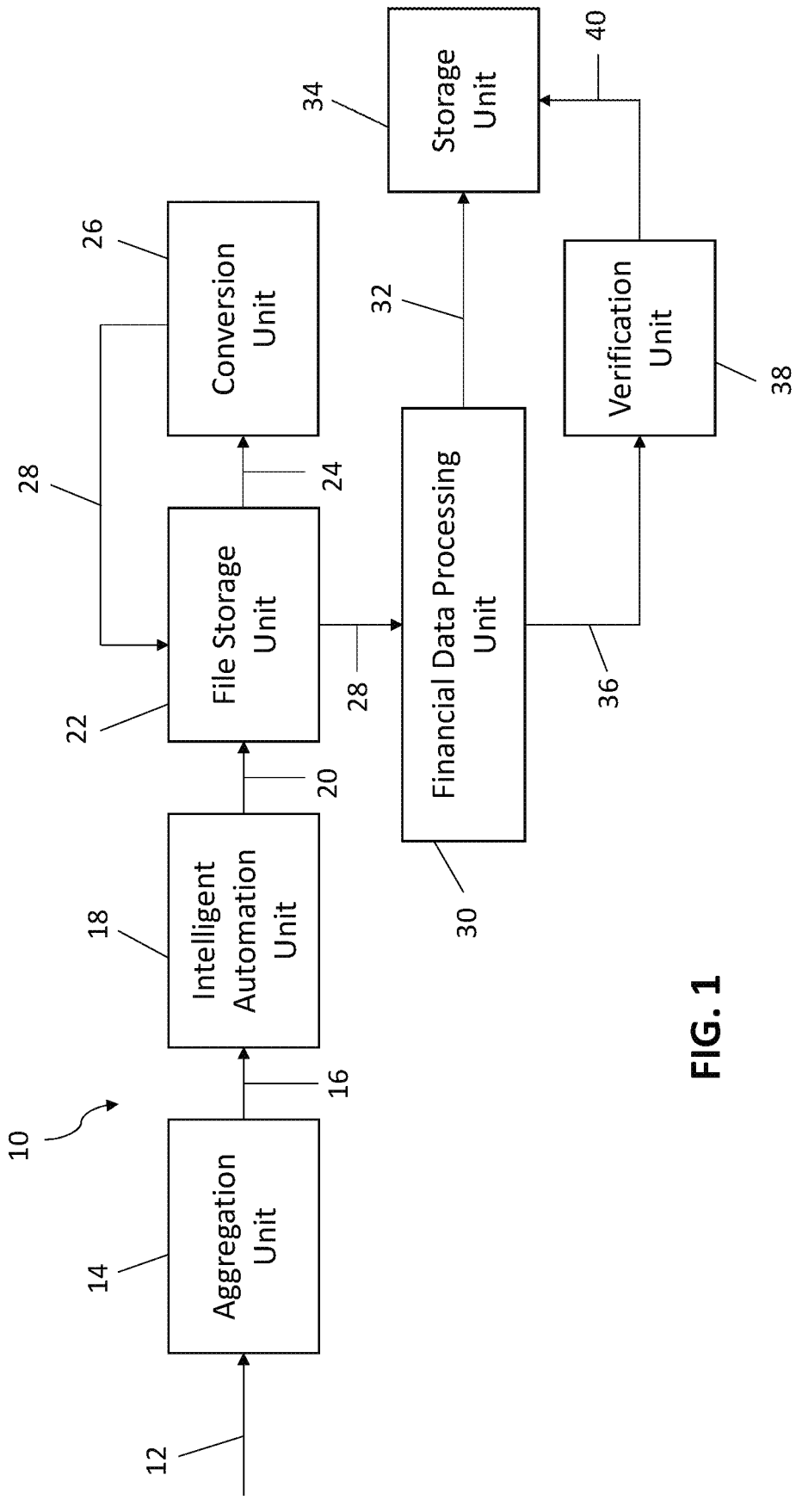
FIG. 1 is a schematic block diagram of the financial report analysis system according to the teachings of the present invention.

As used herein, the term "source data" can include any type of data from any suitable source that would benefit from being converted into a more usable form. The source data can include, for example, financial data. The source data can be in hard copy or written form, such as in printed documents, or can be in digital file formats, such as in portable document format (PDFs), word processing file formats such as WORD documents, as well as other file formats including hypertext markup language (HTML) and extensible markup language (XML) file formats and the like. It is well known in the art that the hard copies can be digitized and the relevant data extracted therefrom. The data can also be harmonized prior to processing by the system. For example, the source data can be converted into a PDF format for subsequent processing.

As used herein the term "financial data" or "financial related data" is intended to include any source data that is associated with or contains financial or financial related information. The financial information can include information that is presented in free form, in tabular format, or in a financial report, and is related to data associated with business, financial, monetary, tax, or pecuniary interests. The financial information can also include operational data that is associated with the processing of the financial data by the system. The operational data can include for example engineering data, manufacturing process data, and the like. Further, the financial data can have a deliverables portion, where the deliverables are associated with the analysis or preparation of financial reports or reports displaying the data associated with the deliverable.

As used herein, the term "enterprise" is intended to include a structure, facility, business, company, operation, organization, or entity of any size. Further, the term is intended to include an individual or group of individuals, or a device of any type.

As used herein, the term "financial data processing unit" or "financial data processing subsystem" is intended to include any unit implemented in hardware, software or a combination thereof, that applies financial or business rules and models and the like, to data of any type, including financial data, so as create or generate one or more financial reports or to analyze, audit, verify, and/or reconcile the financial reports. The financial rules and modeling can include applying known and/or custom business concepts, accounting concepts, tax concepts, audit concepts, consulting concepts, advisory concepts, machine learning techniques, and the like.

As used herein, the term "financial reports" is intended to include any type of filing, statement or report that exists in any suitable format (e.g., printed or in digital file format) that sets forth or includes financial data, including, for example, financial statements, audit reports, audit evaluation results, financial analysis or evaluation results, tax returns, income statements, cash flow statements, balance sheets, 10-K statements, 10-Q statements, 8-K statements, 11-K statement, SC 13G statements, S-8 statements, S-1 statement, annual reports, loan applications, credit history reports, invoices, and the like.

As used herein, the term "tax return" or "tax filing" is intended to include any statement, report, document or form that exists in any format that is filed with a tax authority, such as a state or local tax authority or collection agency, or a national or country specific tax authority, such as for example the Internal Revenue Service (IRS) in the United States. The report can contain any specific arrangement and presentation of financial data that is used to calculate taxes, such as income tax or other taxes, or to collate or file tax related information. The tax returns are generally prepared using forms prescribed by the tax authority and can be prepared by a suitable tax professional.

As used herein, the term "financial expert" is intended to include any system, person, group of people, or enterprise that reviews, analyzes, and/or processes financial data, and generates one or more financial reports. The financial expert can also provide tax, accounting, auditing, consulting, and/or business related services. Examples of financial experts include tax firms, accounting firms, auditing firms, and firms that perform a combination of these services, as well as selected systems for automatically performing these functions.

The term "application" or "software application" or "program" as used herein is intended to include or designate any type of procedural software application and associated software code which can be called or can call other such procedural calls or that can communicate with a user interface or access a data store. The software application can also include called functions, procedures, and/or methods.

The term "graphical user interface" or "user interface" as used herein refers to any software application or program, which is used to present data to an operator or end user via any selected hardware device, including a display screen, or which is used to acquire data from an operator or end user for display on the display screen. The interface can be a series or system of interactive visual components that can be executed by suitable software. The user interface can hence include screens, windows, frames, panes, forms, reports, pages, buttons, icons, objects, menus, tab elements, and other types of graphical elements that convey or display information, execute commands, and represent actions that can be taken by the user. The objects can remain static or can change or vary when the user interacts with them.

As used herein, the term "machine learning" is intended to mean the application of one or more software application techniques or models that process and analyze data to draw inferences and/or predictions from patterns in the data. The machine learning techniques can include a variety of models or algorithms, including supervised learning techniques, unsupervised learning techniques, reinforcement learning techniques, knowledge-based learning techniques, natural-language-based learning techniques such as natural language generation, natural language processing (NLP) and named entity recognition (NER), deep learning techniques, and the like. The machine learning techniques are trained using training data. The training data is used to modify and fine-tune any weights associated with the machine learning models, as well as record ground truth for where correct answers can be found within the data. As such, the better the training data, the more accurate and effective the machine learning model.

The present invention is directed to a financial report analysis system for automatically analyzing and auditing financial data components of source data. The financial data can include for example financial reports, such as financial statements, and the like. The illustrated financial report analysis system 10 receives financial data 12 from one or more data sources that communicate with the system. The data sources can include financial data systems from an enterprise, such as a company, organization and the like. For purposes of simplicity, we use the terms enterprise and company interchangeably herein. The company can employ a series of enterprise resource planning (ERP) systems, or other types of systems, that form the source of the financial data 12. The ERP systems can be housed in a single location or in multiple different locations, or can be cloud hosted, such as for example by using Amazon (e.g., AWS), Microsoft (e.g., Azure), or Google (e.g., Google cloud) cloud hosting services. The ERP systems can be implemented using any known electronic device employing conventional data analytics and processing applications, such as those from Oracle, Salesforce, SAP, ServiceMax and the like. The ERP systems can provide any selected type of source data, including the financial data 12, in structured (e.g., tables and reports), semi-structured, and/or unstructured (e.g., invoices, PDFs, and the like) forms. The ERP systems can thus be employed to extract the financial data 12 from the source data that is subsequently used by the financial report analysis system 10 of the present invention. The financial data 12 can also be provided by other data sources, including governmental authorities, company websites, other enterprises, and the like. For example, the financial reports for United States public companies can be obtained from the Securities and Exchange Commission (SEC). The financial data includes financial reports, including financial statements. The financial statements are written records that convey the business activities and the financial performance of the company. Financial statements are often audited by government agencies, financial experts (e.g., accounting and auditing firms), and the like, to ensure accuracy and for tax, financing, or investing purposes. The financial statements typically include a balance sheet, an income statement, a statement of cash flow, and a statement of changes in equity.

The financial data 12 is automatically aggregated together by an aggregation unit 14. The aggregation unit 14 can be any selected unit capable of receiving and automatically aggregating and storing the financial data 12. According to one embodiment, the aggregation unit 14 can include a shared file storage element that stores the financial data and allows the system to retrieve the stored financial data 16. According to another embodiment, the financial data 12 from the ERP systems can be optionally processed by suitable data integration software to extract the financial data 12 from the ERP systems, integrate the various types and forms of financial data 12, and then store the financial data 12 in the aggregation unit 14, a financial data storage unit, data farm or data repository (e.g., a data lake). The data integration application can also be employed, if desired, to change or transform the various types of data structures associated with the financial data into a common data model structure. If desired, the aggregation unit 14 can optionally employ any suitable data replication software for replicating the financial data stored in the ERP systems or from other data sources for subsequent storage in the aggregation unit. According to one example, the financial data 12 can be provided in various formats and can be pre-processed so as to convert the data into a common file format, such as for example to a PDF file format.

The financial report analysis system 10 includes an intelligent automation unit 18 for receiving the stored financial data 16. The intelligent automation unit 18 can be any suitable intelligent system for automatically handling and scheduling processing of the stored financial data 16. According to one embodiment, the intelligent automation unit 18 can employ suitable robotic process automation (RPA) software applications for automatically handling the stored financial data 16. For example, the intelligent automation unit 18 can intelligently automate selected types of tasks, such as scheduling the retrieval and processing of selected portions of the stored financial data 16. The intelligent automation unit 18 can thus employ one or more rule-based software applications to perform business process activities. An example of a suitable robotic process automation software application includes the automation software from UiPath, USA.

The intelligent automation unit 18 selects the stored financial data 20 to be processed and stores the selected data in an intermediate storage unit 22. The selected financial data 20 can include financial statements in any form or format, and typically includes financial statements having financial data that is provided in any suitable file format. According to one embodiment, the selected financial data includes financial statements in a portable document format (PDF) file format. The storage unit 22 can be any selected type of storage unit, and can optionally employ collaboration software, such as SharePoint by Microsoft Corporation, USA. The collaboration software can be employed to automatically manage data and applications to quickly locate and access data, and allows users to seamlessly collaborate across the company.

The selected financial data 24 stored in the file storage unit 22 is automatically conveyed to and received by a conversion unit 26. The illustrated conversion unit 26 automatically ingests, reads, extracts and converts the selected financial data 24 present in the various financial statements forming part of the selected financial data into a form or format that can be employed by the system, and specifically by a financial data processing unit 30. For example, and according to one embodiment, the conversion unit 26 can employ suitable data extraction software applications for identifying and extracting selected text and data from the financial statements that are typically provided in a portable document format (PDF) file. The extraction software can be configured to read the entire financial statement forming part of the financial data and identifying therein and extracting therefrom any associated text, images, graphics, tables, and content. The conversion unit 26 can then generate, based on the selected financial data 24 (e.g., in the PDF file format), converted financial data 28 that can be provided in any suitable file format, such as in a PDF file format, an extensible markup language (XML) file format, an electronic spreadsheet program format such as EXCEL file format, a hypertext markup language (HTML) file format, and the like, in a structured format that is suitable for parsing. According to one embodiment, the converted financial data 28 is provided in an XML format. The converted financial data 28 can include selected information, such as content and boundaries of each paragraph, line, word and table content. The converted financial data 28 can be conveyed to and stored in the storage unit 22.

The converted financial data 28 can be conveyed from the storage unit 22 to a financial data processing unit 30 for automatically processing the converted financial data 28. The financial data processing unit 30 can be configured to parse the converted financial data 28, automatically apply business rules and logic to identify text, dates, and numbers in the data, map the parsed data, and then automatically and optionally apply one or more machine learning models or techniques to the mapped data to perform one or more selected auditing procedures, functions or operations on the mapped data, such as a footing operation, a cross-footing operation, a reconciliation operation, a tie-in operation, a tie-out operation, an internal consistency operation, a recalculation operation, and the like. The financial data processing unit 30 can also generate any suitable types of file, such as an EXCEL file, where the financial data processing unit 30 can perform selected calculations. The model data generated by the machine learning models can be automatically filtered and the filtered data can be marked so as to mark the portions of the mapped data that have been processed. The marked financial data 32 generated by the financial data processing unit 30 can be stored in a storage unit 34. As used herein, the term "marking" or "data marking" or "marked data" is intended to mean the labeling, tagging, annotating, highlighting, or assigning data points to data. The data in the storage unit 34 can be conveyed to one or more reporting units that can employ a user interface generator for generating one or more user interfaces for displaying the data in any selected style or format.

Further, the filtered data 36 generated by the financial data processing unit 30 can be conveyed to a verification unit 38 that can be configured to verify the filtered data 36. For example, the filtered data 36, which can include financial report data, can be compared with suitable financial data from other financial reports, such that the verification unit 38 can verify the accuracy of the filtered data by comparing the data with each other. If the verification unit 38 determines that the data is inaccurate, then the verification unit 38 can highlight or mark the data. The verification unit 38 can employ various techniques to determine whether the data is inaccurate based on the type of auditing procedure being performed. For example, if a footing or cross-footing operation is being performed, the verification unit 38 can compare a selected number or portion of data with the same number or portion of data from another or different financial report or document. By way of example, the verification unit 38 determines if the same number or account balance is being used in multiple subtotals or schedules. In the case of a tie-out auditing operation, the verification unit 38 can determine if the same number in the prior year (PY) document is being used for multiple tie-outs in the current calendar year (CY) document or vice versa.

According to another practice, the filtered data can also be compared to one or more predetermined conditions to determine if a match occurs. The conditions refer to various business rules or constraints that the system 10 employs to identify selected types of auditing procedures, such as tie-outs, calculations, and the like. By way of simple example, for a PY tick mark to be marked or highlighted, the verification unit 38 compares and matches one or more of the CY row label with the PY row label, the CY column header with the PY column header, denominations of the currency, numbers, and the like. The data matches comply or satisfy all of the conditions. Once all of the passed matches are identified, the matches are conveyed to the verification unit 38, which identifies or filters the matches that are possibly incorrect by employing one or more of the foregoing verification rules. Only the matches that do not pass through the verification condition are marked or highlighted b the verification unit 38. If any of the matches pass through the verification process, the verification can optionally mark the data as verified. Specifically, the verification unit 38 can determine if multiple matches for a single data entity (e.g., a value or amount) exist, thereby satisfying all criteria or conditions and the verification unit 38 can hence verify the specific data as being accurate. If multiple different matches of the data entity exist or occur, then the verification unit 38 can highlight such data entities as potentially being inaccurate and that an error may exist. The highlighted data 40 can then be stored in the storage unit 34.

Figure 2:
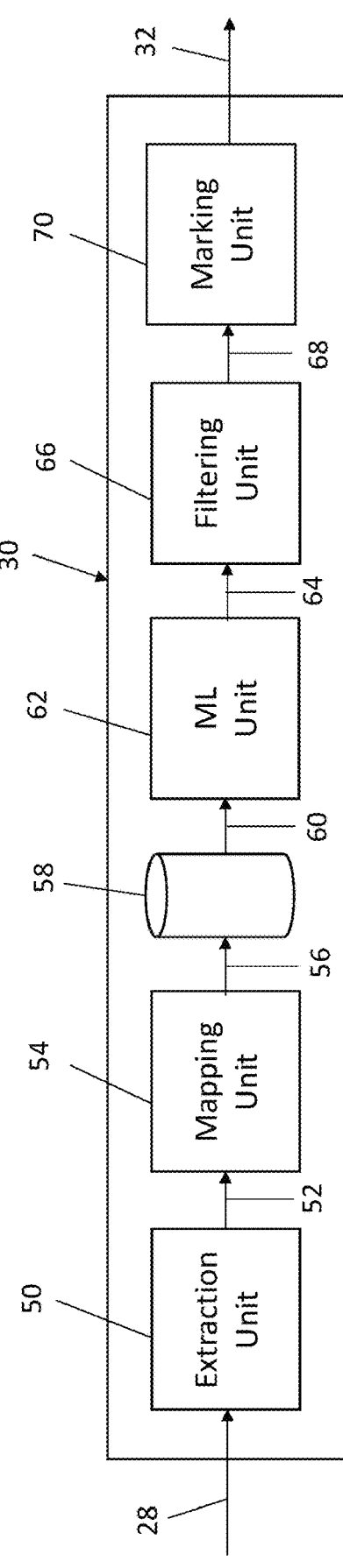
FIG. 2 is a schematic block diagram of the financial data processing unit of the financial report analysis system of FIG. 1 according to the teachings of the present invention.

The specifics of the financial data processing unit 30 are shown for example in FIG. 2. The illustrated financial data processing unit 30 receives for further processing the converted financial data 28 that can include, according to one example, PDF files and XML files. The files can include financial report information including text, boundary information associated with each paragraph and line in the file, and table content data. The financial data processing unit 30 includes an extraction unit 50 for parsing the converted financial data 28 by splitting the data into component parts and for applying one or more business rules and logic to the parsed data so as to recognize different patterns in the data, including text patterns, and to recognize dates and numbers therein. As used herein, the term "business rules" or "business logic" are intended to includes rules, various conditions, patterns, decision logic or process flows that are translated into programmable logic for the financial data processing unit 30. For the sake of simplicity, examples of business rules can include dates, amount, money balance, percentages, and the like. The business rules can function as data entities as identified by the extraction unit 50. By simple of way of example, the extraction unit 50 can employ as a business rule that any number in a sentence pre-fixed with money of a dollar amount is determined to be a money/amount/balance. Similarly, numbers having a percentage symbol (%) next to the number, or in case of tables if the column header has the percentage symbol, then the numbers associated therewith can be tagged as a percentage entity. Similarly, in tables, the extraction unit 50 can employ one or more business rules and logic for the determination of row labels and column headers. In most instances, the entity "date" can be in the column header and the entity "context or account name" is in the row labels. These entities can be tagged with each other and used for performing one or more auditing procedures, such as prior year tie-outs, internal consistency, recalculation, and the like. According to another example, the business rules can also include that an indication of a year/date within a sentence can be tagged and mapped to the entities "context/account head" and "amount/balance" using the number of occurrences of various entities (i.e., dates, percentages, balance etc.) in the sentence.

The extraction unit 50 generates parsed financial data 52 that is received and processed by a mapping unit 54 for mapping the parsed financial data to other financial data, including parsed financial data. For example, the mapping unit 54 can associate and map the dates and numbers forming part of the parsed financial data 52 to the dates and numbers located in other financial reports or in other sections or portions of the same financial report. The mapping unit 54 then generates mapped financial data 56. The extraction unit 50 can employ one or more business rules directed to locating in a sentence information associated with account heads and their respective account balances for a certain period of time. As a simple illustrative example, ff in the identified sentence there is an indication that Cash and Cash equivalents is $45 million and $40 million in 2021 and 2020, the extraction unit 50 tags the various monetary amounts in the sentence as account balances entity (e.g., tagged money/amount/account balance) and the years as a year entity (i.e., date/year). Once the account balances and year are tagged, the account head/context can be mapped to the amount/account balance/money by the mapping unit 54. By way of further example, the year can also be mapped to the amount/account balance/money in sequential order. The mapped financial data 56 can then be stored in a storage unit 58. The storage unit 58 can be any selected type of storage unit, such as a database. According to one embodiment, the storage unit 58 is an XML database. Those of ordinary skill will readily recognize that the parsing and mapping operations can be performed by the same unit.

The mapped financial data 56 stored in the storage unit 58 can be conveyed to a machine learning unit 62. The machine learning unit 62 can apply one or more machine learning techniques, such as a cosine similarity operation, to the stored mapped financial data 60 based on the type of auditing operation to be performed, although not all auditing operations need employ or have associated therewith (such as by tagging) a machine learning technique. For example, a footing operation, a cross-footing operation, or a recalculation operation need not employ a machine learning technique. The footing auditing procedure or operation concerns performing an arithmetic operation, such as addition, on the financial data in a specific column in the financial statement. The footing is the final or account balance when adding together the debits and credits in a column, and are placed at the end of a column. The footings can be used in accounting to determine final balances to be placed in a financial statement. The cross-footing auditing procedure can be used to verify, or cross verify, that all the numbers in a row add up. Specifically, to cross-foot is to ensure that a sum of column totals equals the grand total. The recalculation auditing procedure recalculates tables that are common in the financial statements and then compares the recalculated amounts with the original balances. Examples can include year over year change calculations, percentage of total, percentage of investments, weighted average shares, earnings per share, and the like.

The machine learning unit 62 can optionally apply one or more machine learning techniques to the mapped financial data 60 to perform a different auditing procedure or operation. For example, the machine learning unit 62 can apply a machine learning technique, such as a cosine similarity technique, to the stored mapped data 60 to perform a tie out operation as part of the auditing procedure implemented by the financial report analysis system 10. The tie out auditing procedure refers to the process of referencing each number amount in the company's financial statements (e.g., 10-K, 10-Q, or annual report) back to a prior year audited financial statement or source documents to ensure that the statements are correct. For example, if revenue in the financial statements was $25, then the machine learning unit ensures that the revenue number in the audit workpapers is $25. In other words, to tie out means to implement the means of auditing the accuracy of documents.

The machine learning unit 62 can also apply one or more other machine learning techniques to the mapped financial data 60 to perform a different auditing operation. For example, the machine learning unit 62 can apply a different machine learning technique to the stored mapped data 60 to perform an internal consistency operation as part of the audit procedure implemented by the financial report analysis system 10. The internal consistency operation checks the consistency of the numbers in the financial statement by checking or verifying the accuracy (e.g., consistency) of numbers between various sections of the financial statement. Examples of suitable machine learning techniques can include a natural language process technique such as stemming or itemization, a token set ration technique, a string distance method technique, and the like.

The machine learning unit 62 can then generate model data 64 that is received and processed by a filtering unit 66. The filtering unit 66 can apply one or more business rules to the model data 64 to remove or filter inaccurate data from the model data. The inaccurate data can include incorrectly mapped or incorrectly calculated data. For example, the filtering unit 66 can filter out incorrect mathematical operations, such as incorrect tie outs and the like. Specifically, the filtering unit 66 can employ one or more business rules as part of the filtering process to eliminate incorrect calculations or tie-outs. The filtering unit 66 can thus be used to filter out potential inaccuracies in the data that are created by selected auditing procedures, such as in footing and cross-footing auditing procedures using key words in row labels or column headers. The filtering unit 66 can also determine if any mathematical formulas identified as part of a calculation produces consistent results across different columns. The filtering unit 66 can also filter out potential inaccuracies in prior year tie outs and internal consistency using a threshold or confidence level in the similarity score generated by the machine learning technique for the given context and that is mapped to specific numeric entities. Further, certain calculations can be labelled to be marked as a highlighted tickmark (i.e., verify tickmarks). The filtering unit 62 can generate the filtered financial data 68.

The filtered financial data 68 is received and processed by a marking unit 70. The marking unit 70 can analyze the filtered financial data 68 and apply thereto appropriate markings to selected portions of the processed financial data. The markings can correspond to an indication or identification of the type of auditing procedures that were performed to the data. According to one embodiment, the filtered financial data 68 can be disposed or contained within a PDF file and the marking unit 70 can apply annotations or tickmarks to selected portions of the filtered financial data. The tickmarks format can be predefined or can be modified by the user. For example, the marking unit 70 can employ a predefined library of annotations or tickmarks that can be employed and applied to the filtered financial data 68. The tickmarks can correspond to, for example, different audit procedures, such as footing, cross-footing, reconciliation, recalculation, tie-in, tie-out, prior year, and internal consistency type operations. The marking unit 70 generates the marked financial data 32.

FIGS. 3A and 3B illustrate an example of the filtered financial data 68 generated by the filtering unit 66 and the marked financial data 32 generated by the marking unit 70. For example, as shown in FIG. 3A, the filtered financial data 68 can include, for example, a portion of a financial statement, such as an income statement portion 90. The income statement portion 90 can include financial data 92 of the enterprise. The filtered financial data 68 is then received and processed by the marking unit 70, which can generate in turn marked financial data 32, as shown for example in FIG. 3B. The illustrated marking unit 70 processes the income statement portion 90 and associated financial data 92 and applies one or more markings 94 thereto. The markings 94 can include various marking types and designations that indicate or convey selected types of information. For example, the markings 94 can be configured to indicate or be representative of selected types of financial data and to indicate various types of auditing procedures that were performed by the system on the financial data. According to one embodiment, the marking unit 70 can be configured to apply the marking designation PY to the financial data 92 to indicate a reference to prior year financial data, apply the marking designation F to the financial data 92 to indicate that a footing operation has been performed, and apply the marking designation IS to the financial data to indicate the specific type of financial data being processed includes income statement specific financial data.

Figure 3D:
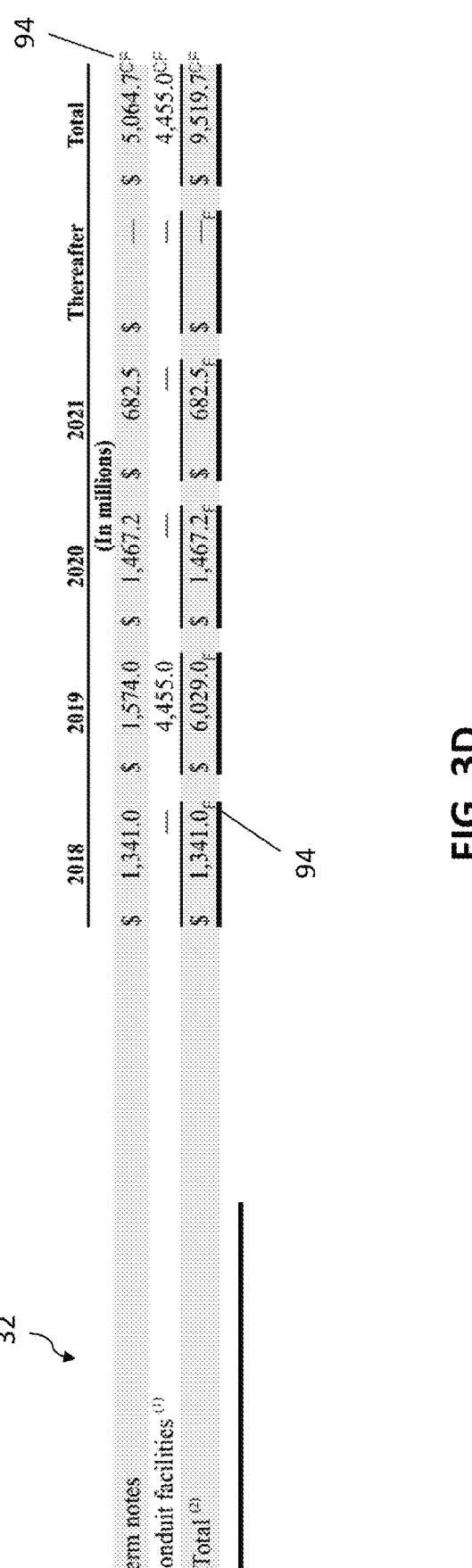

FIG. 3C illustrates the markings 94 that can be applied to the filtered financial data 68 that includes company revenue information 96 by the marking unit 70. The illustrated marked financial data 32 can include the markings 94. In the current example, the marking unit 70 can be configured to apply the marking designation Rx to the revenue information 96 to indicate that the identified revenue information was recalculated by the system. FIG. 3D illustrates the markings 94 generated by the marking unit 70 in the marked financial data 32. The illustrated markings 94 can include an F marking as well as a CF marking, which is indicative of a cross-footing operation having been performed.

Figure 3E:
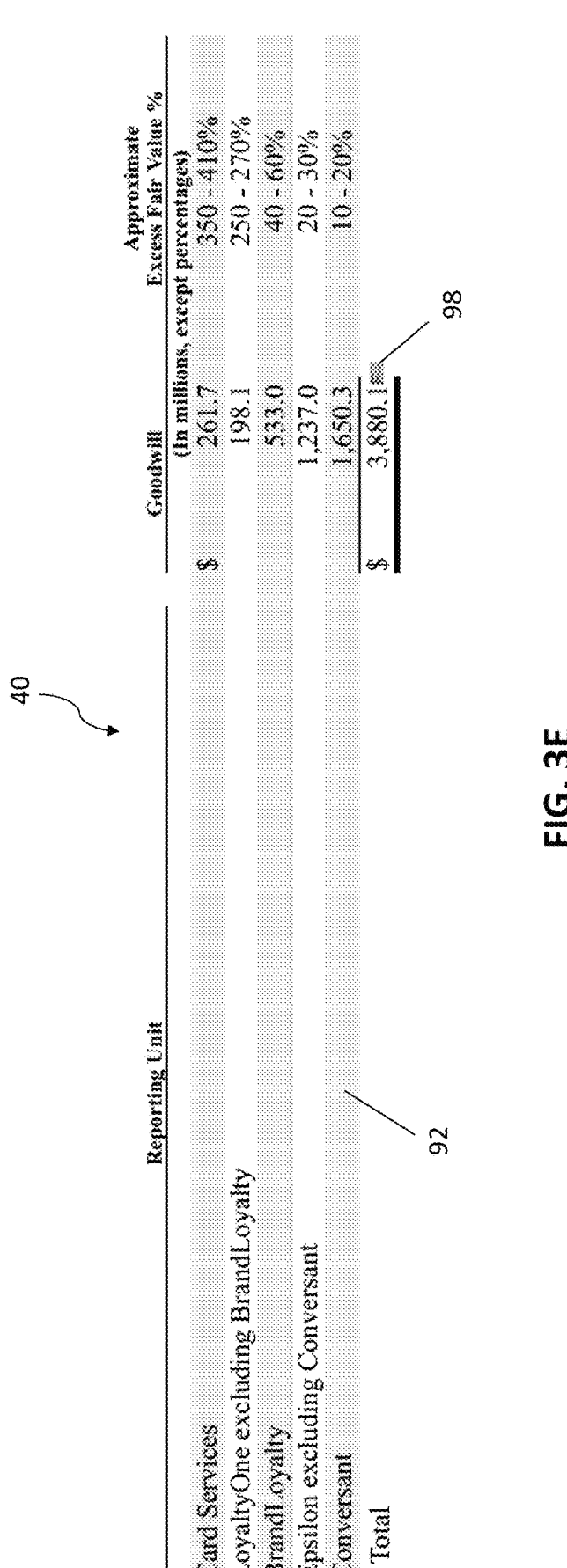
FIG. 3E is an illustration of the highlighted financial data generated by the verification unit of the financial report analysis system according to the teachings of the present invention.

As discussed herein, the filtered financial data 68, 36 generated by the filtering unit 66 can be processed by the verification unit 38 to generate highlighted financial data 40 that includes financial data 92 having one or more highlights or highlighted markings 98 associated therewith, as shown for example in FIG. 3E. Specifically, the filtered data 68, 36 generated by the filtering unit can be conveyed to a verification unit 38 that can be configured to verify the filtered data. For example, the filtered data, which can include financial report data, can be compared with suitable financial data from other financial reports, such that the verification unit 38 can verify the accuracy of the filtered data by comparing the data with each other. If the verification unit 38 determines that the data is inaccurate or has a verification or confidence factor score below a selected threshold score level, then the verification unit 38 can highlight the data. For example, the highlighted markings 98 can include a highlight that is indicative of a need for the system or user to verify the highlighted data. The highlighted data 40 can then be stored in the storage unit 34. As used herein, the term "highlight" or "highlighting" or "data highlighting" is intended to mean the calling out, labeling, tagging, annotating, marking, visually emphasizing or illuminating of data such that the data is more recognizable by a computer or by a user. The highlighting can include presenting the data in different colors, font, size, and the like, or by providing additional data or markings alongside or adjacent to the data.

In operation, the financial report analysis system 10 can receive financial data 12 from one or more data sources. According to one embodiment, the financial data 12 can include the current year and the prior year financial statements of the company, as well as any additional financial reports, such as 10-K and 10-Q reports and annual statements. The financial data 12 can be aggregated by the aggregation unit 14. The aggregated and stored financial data 16 is received and processed by the intelligent automation unit 18. The intelligent automation unit 18 can then proceed to automatically perform selected designated tasks, such as scheduling the retrieval and processing of selected portions of the stored financial data 16. For example, the intelligent automation unit 18 can select particular input files and place the input files, which includes specific financial data, into the file storage unit 22. The stored files are then received and processed by the conversion unit 26. If, for example, the stored files include one or more financial statements having financial data associated therewith, the conversion unit reads the entire financial statement and provides output in a selected format. According to one embodiment, the output from the conversion unit 26 can include structured financial data in an XML format that is configured to be processed by the financial data processing unit 30. The XML file can include selected information, such as content and boundaries of each paragraph, line, word and table content in the financial statement.

The XML file is then transferred to and stored within the storage unit 22, which can also include a PDF version of the financial statement. The intelligent automation unit 18 can then transfer the input files 28, including both the PDF file and the XML file, to the extraction unit 50. The extraction unit 50 can operate as an extraction engine/XML parser that parses the input files (e.g., converted financial data 28) and recognizes different patterns of text, dates and numbers based on selected predefined business rules. The extraction unit 50 can generate extracted financial 52 data that is processed by a mapping unit 54 for mapping the parsed financial data to other financial data, including parsed financial data. The mapped financial data 56 is stored in a database 58 to be consumed by further portions of the financial data processing unit 30. The output stored financial data 60 is then conveyed to a machine learning unit 62 so as to apply selectively thereto business intelligence and business logic (e.g., one or more machine learning techniques) so as to perform selected auditing procedures, such as prior year tie-out, footing, cross-footing, internal consistency, recalculation, and the like. The model data 64 generated by the machine learning unit 62 is processed by a filtering unit 66 that applies one or more business rules to the model data 64 to remove or filter inaccurate data from the model data. The inaccurate data can include incorrectly mapped or incorrectly calculated data. For example, the filtering unit 66 can filter out incorrect mathematical operations, such as incorrect tie outs and the like. Specifically, the filtering unit 66 can employ one or more business rules as part of the filtering process to eliminate incorrect calculations or tie-outs. The filtering unit 66 can thus be used to filter out potential inaccuracies in the data that are created by selected auditing procedures. Certain audit procedures that cannot be resolved are flagged for verification by highlighting by the verification unit 38. Specifically, the filtered data 36, which can include financial report data, can be compared with suitable financial data from other financial reports, such that the verification unit 38 can verify the accuracy of the filtered data by comparing the data with each other. If the verification unit 38 determines that the data is inaccurate or has a verification or confidence factor score below a selected threshold score level, then the verification unit 38 can highlight the data to generate highlighted financial data 40 that can include, for example, a highlighted PDF annotation do as to flag the selected highlighted data for further review and processing. Further, the filtered financial data 68 can be processed by the marking unit 70 that creates or generates marked financial data 32 in the form of a PDF file having selected financial data associated therewith. Selected portions of the data are marked or annotated to form a final output PDF file with annotations or tickmarks. The marked data 32 can also include a footing file, which can be an Excel file that includes extracted tables showing calculations for the various auditing procedures, including footing, cross-footing, recalculation, and the like; a procedure execution log which is an excel file detailing the list of all annotations or tickmarks; and a tickmark count file which is an Excel file with a count of various types of tickmarks.

The foregoing description may provide illustration and description of various embodiments of the invention, but is not intended to be exhaustive or to limit the invention to the precise form disclosed. Modifications and variations of the financial report analysis system of the present invention may be possible in light of the above teachings or may be acquired from practice of the invention. For example, while a series of acts has been described above, the order of the acts may be modified in other implementations consistent with the principles of the invention. Further, non-dependent acts may be performed in parallel.

In addition, one or more implementations consistent with principles of the invention may be implemented using one or more devices and/or configurations other than those illustrated in the Figures and described in the Specification without departing from the spirit of the invention. One or more devices and/or components may be added and/or removed from the implementations of the figures depending on specific deployments and/or applications. Also, one or more disclosed implementations may not be limited to a specific combination of hardware. Furthermore, certain portions of the invention may be implemented as logic that may perform one or more functions. This logic may include hardware, such as hardwired logic, an application-specific integrated circuit, a field programmable gate array, a microprocessor, software, or a combination of hardware and software.

No element, act, or instruction used in the description of the invention should be construed critical or essential to the invention unless explicitly described as such. Also, as used herein, the article "a" is intended to include one or more items. Where only one item is intended, the term "a single" or similar language is used. Further, the phrase "based on," as used herein is intended to mean "based, at least in part, on" unless explicitly stated otherwise. In addition, the term "user", as used herein, is intended to be broadly interpreted to include, for example, an electronic device (e.g., a workstation) or a user of an electronic device, unless otherwise stated.

Further, the invention can be employed using any combination of features or elements as described above, and are not limited to the current recited steps or features.

Exemplary Hardware

It is to be understood that although the present invention has been described above in terms of particular embodiments, the foregoing embodiments are provided as illustrative only, and do not limit or define the scope of the invention. Various other embodiments, including but not limited to those described herein are also within the scope of the claims. For example, elements, units, modules, engines, tools and components described herein may be further divided into additional components or joined together to form fewer components for performing the same functions.

Any of the functions disclosed herein may be implemented using means for performing those functions. Such means include, but are not limited to, any of the components, units or engines disclosed herein, such as the electronic or computing device components described herein.

The techniques described above and below may be implemented, for example, in hardware, one or more computer programs tangibly stored on one or more computer-readable media, firmware, or any combination thereof. The techniques described above may be implemented in one or more computer programs executing on (or executable by) a programmable computer or electronic device having any combination of any number of the following: a processor, a storage medium readable and/or writable by the processor (including, for example, volatile and non-volatile memory and/or storage elements), an input device, an output device, and a display. Program code may be applied to input entered using the input device to perform the functions described and to generate output using the output device.

The term computing device or electronic device as used herein can refer to any device that includes a processor and a computer-readable memory capable of storing computer-readable instructions, and in which the processor is capable of executing the computer-readable instructions in the memory. The terms computer system and computing system refer herein to a system containing one or more computing devices.

Embodiments of the present invention include features which are only possible and/or feasible to implement with the use of one or more computers, computer processors, and/or other elements of a computer system. Such features are either impossible or impractical to implement mentally and/or manually. For example, embodiments of the present invention may operate on digital electronic processes which can only be created, stored, modified, processed, and transmitted by computing devices and other electronic devices.

Such embodiments, therefore, address problems which are inherently computer-related and solve such problems using computer technology in ways which cannot be solved manually or mentally by humans.

Any claims herein which affirmatively require a computer, an electronic device, a computing device, a processor, a memory, storage, or similar computer-related elements, are intended to require such elements, and should not be interpreted as if such elements are not present in or required by such claims. Such claims are not intended, and should not be interpreted, to cover methods and/or systems which lack the recited computer-related elements if such elements are recited. For example, any method claim herein which recites that the claimed method is performed by a computer, a processor, a memory, and/or similar computer-related element, is intended to encompass methods which are performed by the recited computer-related element(s). Such a method claim should not be interpreted, for example, to encompass a method that is performed mentally or by hand (e.g., using pencil and paper). Similarly, any product or computer readable medium claim herein which recites that the claimed product includes a computer, a processor, a memory, and/or similar computer-related element, is intended to, and should only be interpreted to, encompass products which include the recited computer-related element (s). Such a product claim should not be interpreted, for example, to encompass a product that does not include the recited computer-related element(s).

Embodiments of the present invention solve one or more problems that are inherently rooted in computer technology. For example, embodiments of the present invention solve the problem of how to generate a virtual garment and an avatar of a user, and to overlay the virtual garment on the avatar. There is no analog to this problem in the non-computer environment, nor is there an analog to the solutions disclosed herein in the non-computer environment.

Furthermore, embodiments of the present invention represent improvements to computer and communication technology itself. For example, the system 10 of the present can optionally employ a specially programmed or special purpose computer in an improved computer system, which may, for example, be implemented within a single computing or electronic device.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements can also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

It should be appreciated that various concepts, systems and methods described above can be implemented in any number of ways, as the disclosed concepts are not limited to any particular manner of implementation or system configuration. Examples of specific implementations and applications are discussed below and shown in FIG. 4 primarily for illustrative purposes and for providing or describing the operating environment of the system of the present invention. The financial report analysis system 10 and/or elements, modules, units, or engines thereof can employ one or more electronic or computing devices, such as one or more servers, clients, computers, laptops, smartphones and the like, that are networked together or which are arranged so as to effectively communicate with each other. The network can be any type or form of network. The devices can be on the same network or on different networks. In some embodiments, the networked system may include multiple, logically-grouped servers. In one of these embodiments, the logical group of servers may be referred to as a server farm or a machine farm. In another of these embodiments, the servers may be geographically dispersed. The electronic devices can communicate through wired connections or through wireless connections. The clients can also be generally referred to as local machines, clients, client nodes, client machines, client computers, client devices, endpoints, or endpoint nodes. The servers can also be referred to herein as servers, server nodes, or remote machines. In some embodiments, a client has the capacity to function as both a client or client node seeking access to resources provided by a server or server node and as a server providing access to hosted resources for other clients. The clients can be any suitable electronic or computing device, including for example, a computer, a server, a smartphone, a smart electronic pad, a portable computer, and the like, such as the illustrated electronic or computing device 300. The system 10 or any associated units or components of the system 10 can employ one or more of the illustrated computing devices and can form a computing system. Further, the server may be a file server, application server, web server, proxy server, appliance, network appliance, gateway, gateway server, virtualization server, deployment server, SSL VPN server, or firewall, or any other suitable electronic or computing device, such as the electronic device 300. In one embodiment, the server may be referred to as a remote machine or a node. In another embodiment, a plurality of nodes may be in the path between any two communicating servers or clients. The financial report analysis system 10 which includes the virtual garment generation unit 16, the avatar generation unit 20, the simulation engine 24, the rendering unit 28, and the fit analysis unit 30 can be stored on or implemented by one or more of the electronic devices described herein (e.g., clients or servers), and the hardware associated with the electronic devices, such as the processor or CPU and memory described below.

Figure 4:
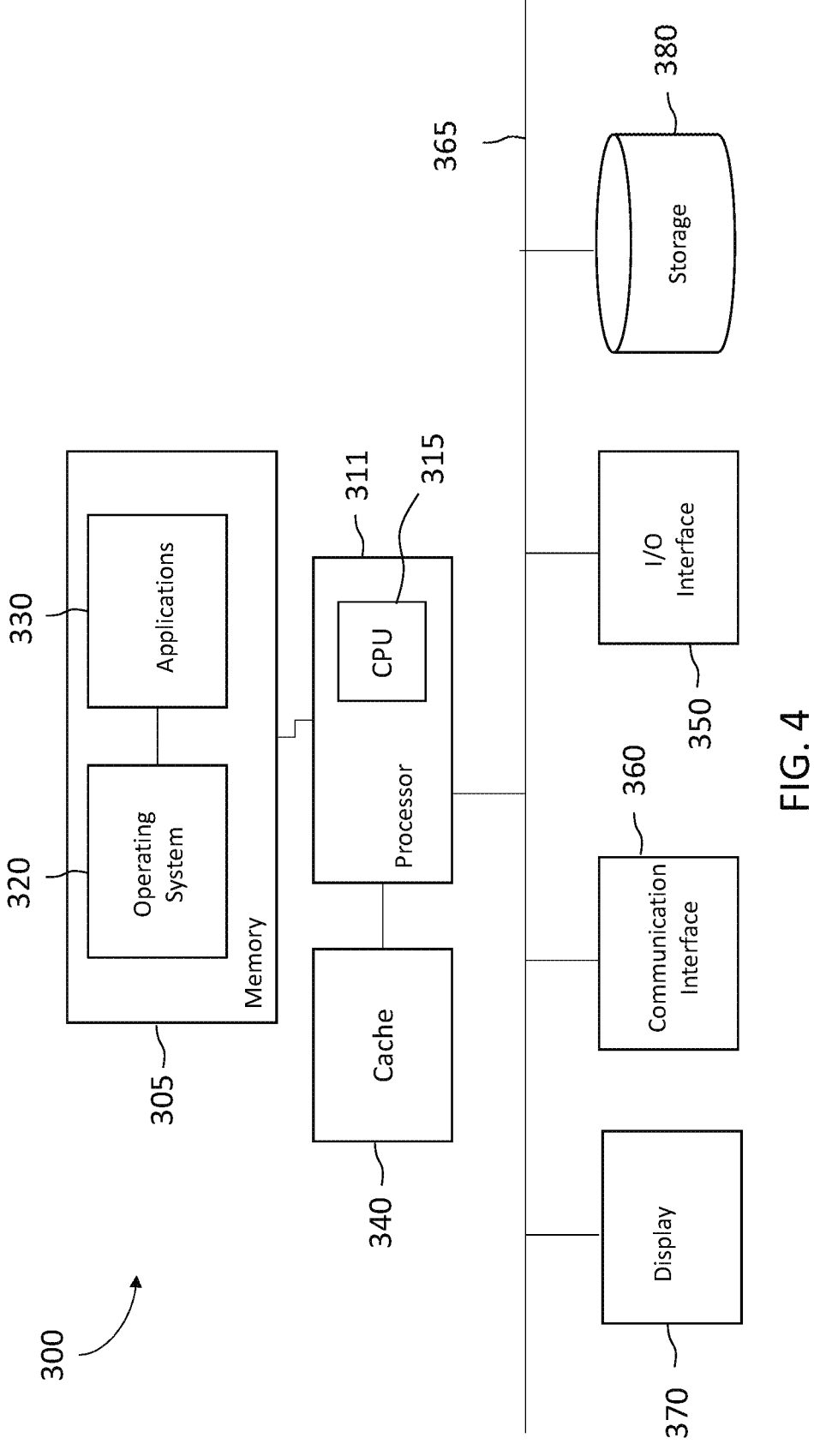
FIG. 4 is a schematic diagram of an electronic device and/or associated system suitable for implementing the garment rendering system of the present invention.

FIG. 4 is a high-level block diagram of an electronic or computing device 300 that can be used with the embodiments disclosed herein. Without limitation, the hardware, software, and techniques described herein can be implemented in digital electronic circuitry or in computer hardware that executes firmware, software, or combinations thereof. The implementation can include a computer program product (e.g., a non-transitory computer program tangibly embodied in a machine-readable storage device, for execution by, or to control the operation of, one or more data processing apparatuses, such as a programmable processor, one or more computers, one or more servers and the like).

The illustrated electronic device 300 can be any suitable electronic circuitry that includes a main memory unit 305 that is connected to a processor 311 having a CPU 315 and a cache unit 340 configured to store copies of the data from the most frequently used main memory 305. The electronic device can implement the process flow identification system 10 or one or more elements of the process flow identification system.

Further, the methods and procedures for carrying out the methods disclosed herein can be performed by one or more programmable processors executing a computer program to perform functions of the invention by operating on input data and generating output. Further, the methods and procedures disclosed herein can also be performed by, and the apparatus disclosed herein can be implemented as, special purpose logic circuitry, such as a FPGA (field programmable gate array) or an ASIC (application specific integrated circuit). Modules and units disclosed herein can also refer to portions of the computer program and/or the processor/special circuitry that implements that functionality.

The processor 311 is any logic circuitry that responds to, processes or manipulates instructions received from the main memory unit, and can be any suitable processor for execution of a computer program. For example, the processor 311 can be a general and/or special purpose microprocessor and/or a processor of a digital computer. The CPU 315 can be any suitable processing unit known in the art. For example, the CPU 315 can be a general and/or special purpose microprocessor, such as an application-specific instruction set processor, graphics processing unit, physics processing unit, digital signal processor, image processor, coprocessor, floating-point processor, network processor, and/or any other suitable processor that can be used in a digital computing circuitry. Alternatively or additionally, the processor can comprise at least one of a multi-core processor and a front-end processor. Generally, the processor 311 can be embodied in any suitable manner. For example, the processor 311 can be embodied as various processing means such as a microprocessor or other processing element, a coprocessor, a controller or various other computing or processing devices including integrated circuits such as, for example, an ASIC (application specific integrated circuit), an FPGA (field programmable gate array), a hardware accelerator, or the like. Additionally or alternatively, the processor 311 can be configured to execute instructions stored in the memory 305 or otherwise accessible to the processor 311. As such, whether configured by hardware or software methods, or by a combination thereof, the processor 311 can represent an entity (e.g., physically embodied in circuitry) capable of performing operations according to embodiments disclosed herein while configured accordingly. Thus, for example, when the processor 311 is embodied as an ASIC, FPGA or the like, the processor 311 can be specifically configured hardware for conducting the operations described herein. Alternatively, as another example, when the processor 311 is embodied as an executor of software instructions, the instructions can specifically configure the processor 311 to perform the operations described herein. In many embodiments, the central processing unit 530 is provided by a microprocessor unit, e.g.: those manufactured by Intel Corporation of Mountain View, Calif.; those manufactured by Motorola Corporation of Schaumburg. Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The processor can be configured to receive and execute instructions received from the main memory 305.

The electronic device 300 applicable to the hardware of the present invention can be based on any of these processors, or any other processor capable of operating as described herein. The central processing unit 315 may utilize instruction level parallelism, thread level parallelism, different levels of cache, and multi-core processors. A multi-core processor may include two or more processing units on a single computing component. Examples of multi-core processors include the AMD PHENOM IIX2, INTEL CORE i5 and INTEL CORE i7.

The processor 311 and the CPU 315 can be configured to receive instructions and data from the main memory 305 (e.g., a read-only memory or a random access memory or both) and execute the instructions. The instructions and other data can be stored in the main memory 305. The processor 311 and the main memory 305 can be included in or supplemented by special purpose logic circuitry. The main memory unit 305 can include one or more memory chips capable of storing data and allowing any storage location to be directly accessed by the processor 311. The main memory unit 305 may be volatile and faster than other memory in the electronic device, or can dynamic random access memory (DRAM) or any variants, including static random access memory (SRAM), Burst SRAM or Synch-Burst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 305 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 305 can be based on any of the above described memory chips, or any other available memory chips capable of operating as described herein. In the embodiment shown in FIG. 4, the processor 311 communicates with main memory 305 via a system bus 365. The computer executable instructions of the present invention may be provided using any computer-readable media that is accessible by the computing or electronic device 300. Computer-readable media may include, for example, the computer memory or storage unit 305. The computer storage media may also include, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer readable storage media does not include communication media. Therefore, a computer storage or memory medium should not be interpreted to be a propagating signal per se or stated another transitory in nature. The propagated signals may be present in a computer storage media, but propagated signals per se are not examples of computer storage media, which is intended to be non-transitory. Although the computer memory or storage unit 305 is shown within the computing device 300 it will be appreciated that the storage may be distributed or located remotely and accessed via a network or other communication link.

The main memory 305 can comprise an operating system 320 that is configured to implement various operating system functions. For example, the operating system 320 can be responsible for controlling access to various devices, memory management, and/or implementing various functions of the asset management system disclosed herein. Generally, the operating system 320 can be any suitable system software that can manage computer hardware and software resources and provide common services for computer programs.

The main memory 305 can also hold application software 330. For example, the main memory 305 and application software 330 can include various computer executable instructions, application software, and data structures, such as computer executable instructions and data structures that implement various aspects of the embodiments described herein. For example, the main memory 305 and application software 330 can include computer executable instructions, application software, and data structures, such as computer executable instructions and data structures that implement various aspects of the content characterization systems disclosed herein, such as processing and capture of information. Generally, the functions performed by the content characterization systems disclosed herein can be implemented in digital electronic circuitry or in computer hardware that executes software, firmware, or combinations thereof. The implementation can be as a computer program product (e.g., a computer program tangibly embodied in a non-transitory machine-readable storage device) for execution by or to control the operation of a data processing apparatus (e.g., a computer, a programmable processor, or multiple computers). Generally, the program codes that can be used with the embodiments disclosed herein can be implemented and written in any form of programming language, including compiled or interpreted languages, and can be deployed in any form, including as a stand-alone program or as a component, module, subroutine, or other unit suitable for use in a computing environment. A computer program can be configured to be executed on a computer, or on multiple computers, at one site or distributed across multiple sites and interconnected by a communications network, such as the Internet.

The processor 311 can further be coupled to a database or data storage 380. The data storage 380 can be configured to store information and data relating to various functions and operations of the content characterization systems disclosed herein. For example, as detailed above, the data storage 380 can store information including but not limited to captured information, multimedia, processed information, and characterized content.

A wide variety of I/O devices may be present in or connected to the electronic device 300. For example, the electronic device can include a display 370, and as previously described, the visual application unit 28 or one or more other elements of the system 10 can include the display. The display 370 can be configured to display information and instructions received from the processor 311. Further, the display 370 can generally be any suitable display available in the art, for example a Liquid Crystal Display (LCD), a light emitting diode (LED) display, digital light processing (DLP) displays, liquid crystal on silicon (LCOS) displays, organic light-emitting diode (OLED) displays, active-matrix organic light-emitting diode (AMO-LED) displays, liquid crystal laser displays, time-multiplexed optical shutter (TMOS) displays, or 3D displays, or electronic papers (e-ink) displays. Furthermore, the display 370 can be a smart and/or touch sensitive display that can receive instructions from a user and forwarded the received information to the processor 311. The input devices can also include user selection devices, such as keyboards, mice, trackpads, trackballs, touchpads, touch mice, multi-touch touchpads, touch mice and the like, as well as microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. The output devices can also include video displays, graphical displays, speakers, headphones, inkjet printers, laser printers, and 3D printers.

The electronic device 300 can also include an Input/Output (I/O) interface 350 that is configured to connect the processor 311 to various interfaces via an input/output (I/O) device interface 380. The device 300 can also include a communications interface 360 that is responsible for providing the circuitry 300 with a connection to a communications network (e.g., communications network 120). Transmission and reception of data and instructions can occur over the communications network.

It will thus be seen that the invention efficiently attains the objects set forth above, among those made apparent from the preceding description. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween.

It is intended that the invention not be limited to the particular embodiments disclosed above, but that the invention will include any and all particular embodiments and equivalents falling within the scope of the following appended claims.

Having described the invention, what is claimed as new and desired to be secured by Letters Patent is:

1. A financial report analysis system, comprising
   a hardware processor;
   a database hardware component comprising a storage device coupled to the hardware processor; and
   a non-transitory computer-readable storage medium storing instructions, which, when executed by the hardware processor, are configured to implement:
   an aggregation unit for aggregating financial data comprising numerical values, text labels, date stamps, and metadata from multiple source documents and for storing the financial data in the database hardware component to form stored financial data,
   an intelligent automation unit for selecting from the stored financial data the financial data to be processed and automatically scheduling for processing the selected financial data,
   a storage unit comprising allocated memory space within the non-transitory computer-readable storage medium for storing the selected financial data,
   a conversion unit for converting the selected financial data stored in the storage unit into a selected processing format comprising a machine-readable structured data format to form converted financial data,
   a financial data processing unit for automatically processing the converted financial data to form processed financial data and for generating marked financial data, the marked financial data comprising the processed financial data with embedded marking data, from the processed financial data that includes one or more markings, the financial data processing unit comprises:
      an extraction unit for automatically parsing the converted financial data by identifying and extracting individual data elements including account numbers, monetary amounts, transaction descriptions, and date fields to form parsed financial data,
      a mapping unit for mapping the parsed financial data with other parsed financial data by establishing relationships between corresponding data elements across different financial documents or reporting periods to form mapped financial data,
      a machine learning unit, implemented by the hardware processor and configured to:
      access training data comprising historical financial data sets that include verified accurate financial data labeled as compliant and verified inaccurate financial data labeled with specific error types, wherein the training data is retrieved from the database hardware component,
      train a plurality of distinct machine learning models using training data specific to an auditing operation type of each machine learning model, wherein training comprises iteratively adjusting model parameters to minimize prediction error between model outputs and labeled training data outcomes,
      receive the mapped financial data and auditing operation type data indicating a selected auditing operation to be performed,
      automatically select a machine learning model from the plurality of distinct machine learning models based on the auditing operation type data, wherein:
         when the auditing operation type data indicates a tie-out operation, select and apply a cosine similarity model from the plurality of distinct machine learning models that computes vector similarity scores between current year financial data elements and prior year financial data elements to identify matching entries across financial reporting periods, when the auditing operation type data indicates a recalculation operation, select and apply a natural language processing model from the plurality of distinct machine learning models comprising tokenization and named entity recognition algorithms to extract and validate numerical relationships within financial statement text, when the auditing operation type data indicates an internal consistency operation, select and apply a string distance measurement model from the plurality of distinct machine learning models that calculates edit distance scores between financial data entries to identify inconsistent reporting of identical financial items, and generate model data comprising an output of the selected machine learning model from the plurality of distinct machine learning models including confidence scores and identified data relationships specific to the selected auditing operation;

a filtering unit for filtering the model data by applying thereto one or more business rules to form filtered financial data, and a marking unit for marking one or more portions of the filtered financial data by generating and associating the marking data with specific data elements that fail to satisfy the business rules or exceed the predefined thresholds, the hardware processor configured to execute the financial data processing unit operations in parallel processing threads and the non-transitory computer-readable storage medium configured to store intermediate processing results including parsed financial data, mapped financial data, and model data in structured database format on the database hardware component for retrieval by subsequent processing units, and a verification unit for verifying an accuracy of the processed financial data by comparing the processed financial data to other financial data comprising reference data from prior financial periods, external data sources, or predefined accounting standards, and then marking portions of the processed data if the data is inaccurate wherein the verification unit marks portions of the filtered financial data if the data is inaccurate by generating marking data that identify the inaccurate data, wherein the verification unit is configured for determining an accuracy of the filtered financial data based on a type of auditing procedure being performed.

2. The system of claim 1, wherein the selected processing format comprising the machine readable structured data format is selected from JSON, XML, or tabular database format with defined field types, wherein numerical financial values are stored as floating-point or decimal data types, text strings are stored as alphanumeric character sequences with defined encoding, and temporal data is stored in standardized date-time format to form the converted financial data.

3. The system of claim 1, wherein the embedded marking data includes one or more markings comprising computer-readable annotations embedded within or linked to specific data elements, wherein each marking comprises a data structure including: (i) a marking type identifier indicating whether the marking identifies an inconsistency, discrepancy, or item requiring verification, (ii) a location identifier specifying the marked data element, (iii) a confidence score indicating a likelihood of error or inconsistency, and (iv) descriptive text explaining the reason for the marking.

4. The system of claim 1, wherein the specific error types of the verified inaccurate data include calculation errors, inconsistencies, and misstatements.

5. The system of claim 1, wherein the machine learning unit is further configured to receive feedback data comprising user verification input indicating whether markings generated by the machine learning unit correctly identified actual errors or inaccuracies in the filtered financial data, and automatically re-train the selected machine learning model by incorporating the feedback data as additional training examples, wherein re-training comprises updating the model parameters based on discrepancies between the model predictions and the user verification input to improve future prediction accuracy.

6. The system of claim 1, wherein the business rules applied by the filtering unit include predefined thresholds, tolerance ranges, and logical conditions specific to financial auditing standards.

7. The system of claim 6, wherein the marking unit is configured to generate and associate the marking data structures with specific data elements that fail to satisfy the business rules or exceed the predefined thresholds.

8. A computer-implemented method for marking financial data, comprising a hardware processor;

a database hardware component comprising a storage device coupled to the hardware processor; and a non-transitory computer-readable storage medium storing instructions, which, when executed by the hardware processor, are configured for:

aggregating financial data comprising numerical values, text labels, date stamps, and metadata from multiple source documents and storing the financial data in the database hardware component to form stored financial data, selecting from the stored financial data the financial data to be processed and automatically scheduling for processing the selected financial data, storing the selected financial data in allocated memory space within the non-transitory computer-readable storage medium, converting the selected financial data into a selected processing format comprising a machine-readable structured data format to form converted financial data, automatically processing with a financial data processing unit the converted financial data to form processed financial data and for generating marked financial data, the marked financial data comprising the processed financial data with embedded marking data, from the processed financial data that includes one or more markings, the financial data processing unit comprises one or more processors programmed for:

automatically parsing the converted financial data by identifying and extracting individual data elements including account numbers, monetary amounts, transaction descriptions, and date fields to form parsed financial data, mapping the parsed financial data with other parsed financial data by establishing relationships between corresponding data elements across different financial documents or reporting periods to form mapped financial data, access training data comprising historical financial data sets that include verified accurate financial data labeled as compliant and verified inaccurate financial data labeled with specific error types, wherein the training data is retrieved from the database hardware component, train a plurality of distinct machine learning models using training data specific to an auditing operation type of each machine learning model, wherein training comprises iteratively adjusting model parameters to minimize prediction error between model outputs and labeled training data outcomes, receive the mapped financial data and auditing operation type data indicating a selected auditing operation to be performed, automatically select a machine learning model from the plurality of distinct machine learning models based on the auditing operation type data, wherein:

when the auditing operation type data indicates a tie-out operation, select and apply a cosine similarity model from the plurality of distinct machine learning models that computes vector similarity scores between current year financial data elements and prior year financial data elements to identify matching entries across financial reporting periods, when the auditing operation type data indicates a recalculation operation, select and apply a natural language processing model from the plurality of distinct machine learning models comprising tokenization and named entity recognition algorithms to extract and validate numerical relationships within financial statement text, when the auditing operation type data indicates an internal consistency operation, select and apply a string distance measurement model from the plurality of distinct machine learning models that calculates edit distance scores between financial data entries to identify inconsistent reporting of identical financial items, and generate model data comprising an output of the selected machine learning model from the plurality of distinct machine learning models including confidence scores and identified data relationships specific to the selected auditing operation;

filtering the model data by applying thereto one or more business rules to form filtered financial data, and marking one or more portions of the filtered financial data by generating and associating the marking data with specific data elements that fail to satisfy the business rules or exceed the predefined thresholds, the hardware processor configured to execute the financial data processing unit operations in parallel processing threads and the non-transitory computer-readable storage medium configured to store intermediate processing results including parsed financial data, mapped financial data, and model data in structured database format on the database hardware component for retrieval by subsequent processing units, and verifying an accuracy of the processed financial data by comparing the processed financial data to other financial data comprising reference data from prior financial periods, external data sources, or predefined accounting standards, and then marking portions of the processed data if the data is inaccurate, and highlighting portions of the filtered financial data if the data is inaccurate by generating marking data that identify the inaccurate data, wherein the verification unit is configured for determining an accuracy of the filtered financial data based on a type of auditing procedure being performed.

9. A non-transitory, computer readable medium comprising computer program instructions tangibly stored on the computer readable medium, wherein the computer program instructions are executable by at least one computer processor to perform a method, the method comprising:

aggregating financial data comprising numerical values, text labels, date stamps, and metadata from multiple source documents and storing the financial data to form stored financial data, selecting from the stored financial data the financial data to be processed and automatically scheduling for processing the selected financial data, storing the selected financial data, converting the selected financial data into a selected processing format comprising a machine-readable structured data format to form converted financial data, automatically processing with a financial data processing unit the converted financial data to form processed financial data and for generating marked financial data, the marked financial data comprising the processed financial data with embedded marking data, from the processed financial data that includes one or more markings, the financial data processing unit comprises one or more processors programmed for:

automatically parsing the converted financial data by identifying and extracting individual data elements including account numbers, monetary amounts, transaction descriptions, and date fields to form parsed financial data, mapping the parsed financial data with other parsed financial data by establishing relationships between corresponding data elements across different financial documents or reporting periods to form mapped financial data, access training data comprising historical financial data sets that include verified accurate financial data labeled as compliant and verified inaccurate financial data labeled with specific error types, wherein the training data is retrieved from the database hardware component, train a plurality of distinct machine learning models using training data specific to an auditing operation type of each machine learning model, wherein training comprises iteratively adjusting model parameters to minimize prediction error between model outputs and labeled training data outcomes, receive the mapped financial data and auditing operation type data indicating a selected auditing operation to be performed, automatically select a machine learning model from the plurality of distinct machine learning models based on the auditing operation type data, wherein:

when the auditing operation type data indicates a tie-out operation, select and apply a cosine similarity model from the plurality of distinct machine learning models that computes vector similarity scores between current year financial data elements and prior year financial data elements to identify matching entries across financial reporting periods, when the auditing operation type data indicates a recalculation operation, select and apply a natural language processing model from the plurality of distinct machine learning models comprising tokenization and named entity recognition algorithms to extract and validate numerical relationships within financial statement text, when the auditing operation type data indicates an internal consistency operation, select and apply a string distance measurement model from the plurality of distinct machine learning models that calculates edit distance scores between financial data entries to identify inconsistent reporting of identical financial items, and generate model data comprising an output of the selected machine learning model from the plurality of distinct machine learning models including confidence scores and identified data relationships specific to the selected auditing operation;

filtering the model data by applying thereto one or more business rules to form filtered financial data wherein the filtering includes calculating confidence scores for machine learning model outputs using similarity score metrics, comparing calculated confidence scores against predetermined threshold values specific to each auditing operation type, automatically filtering out data having confidence scores below the predetermined threshold values to generate the filtered financial data, and marking one or more portions of the filtered financial data by generating and associating the marking data with specific data elements that fail to satisfy the business rules or exceed the predefined thresholds, verifying an accuracy of the processed financial data by comparing the processed financial data to other financial data comprising reference data from prior financial periods, external data sources, or predefined accounting standards, and then marking portions of the processed data if the data is inaccurate, and highlighting portions of the filtered financial data if the data is inaccurate by generating marking data that identify the inaccurate data, wherein the verification unit is configured for determining an accuracy of the filtered financial data based on a type of auditing procedure being performed.

\* \* \* \* \*